3,310,171
APPARATUS AND METHOD FOR PRESSURE-FILTERING
Henry Schmidt, Jr., Hinsdale, and James F. Zievers, La Grange, Ill., assignors to Industrial Filter & Pump Mfg. Co., Cicero, Ill., a corporation of Illinois
Filed June 18, 1964, Ser. No. 376,122
46 Claims. (Cl. 210—81)

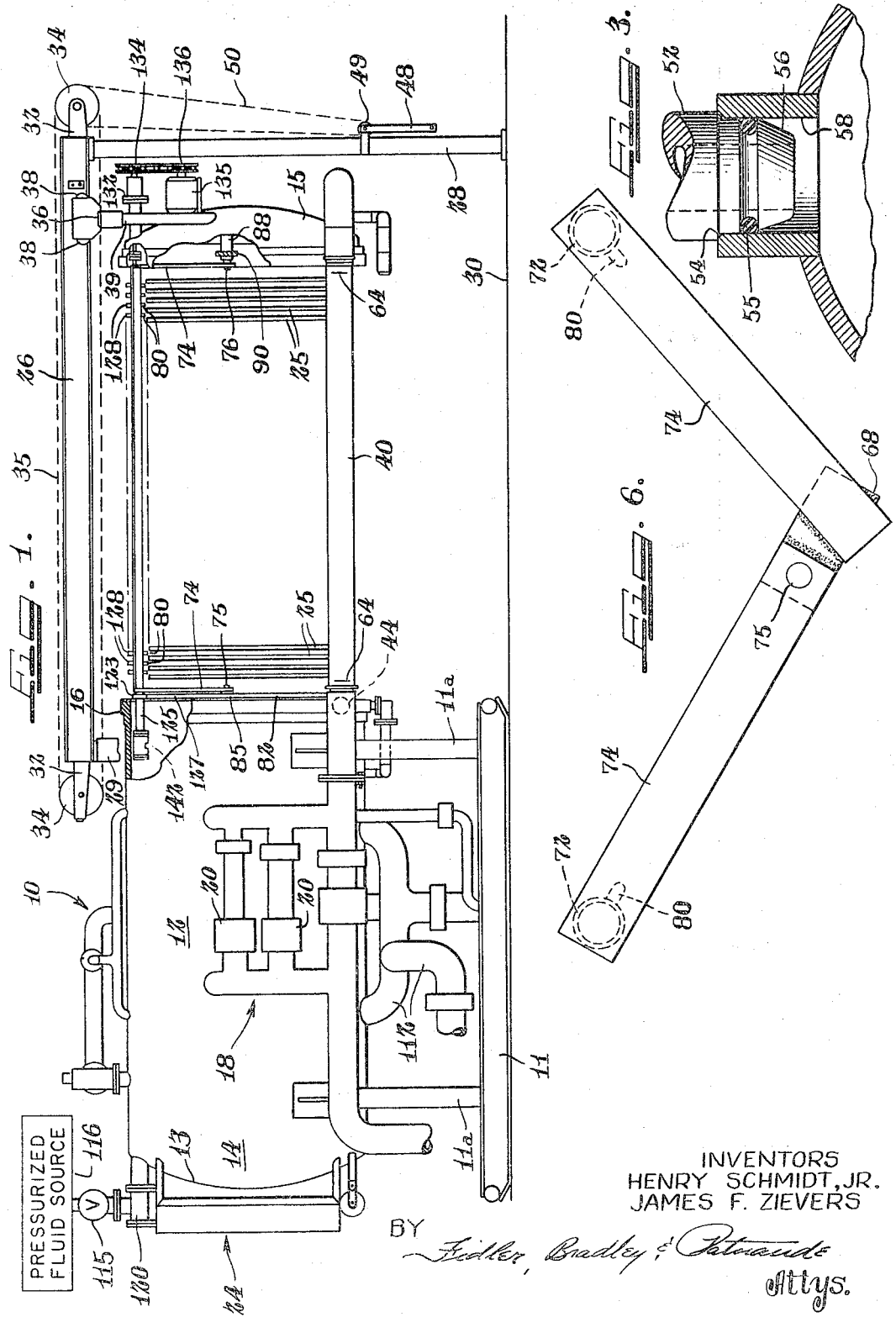

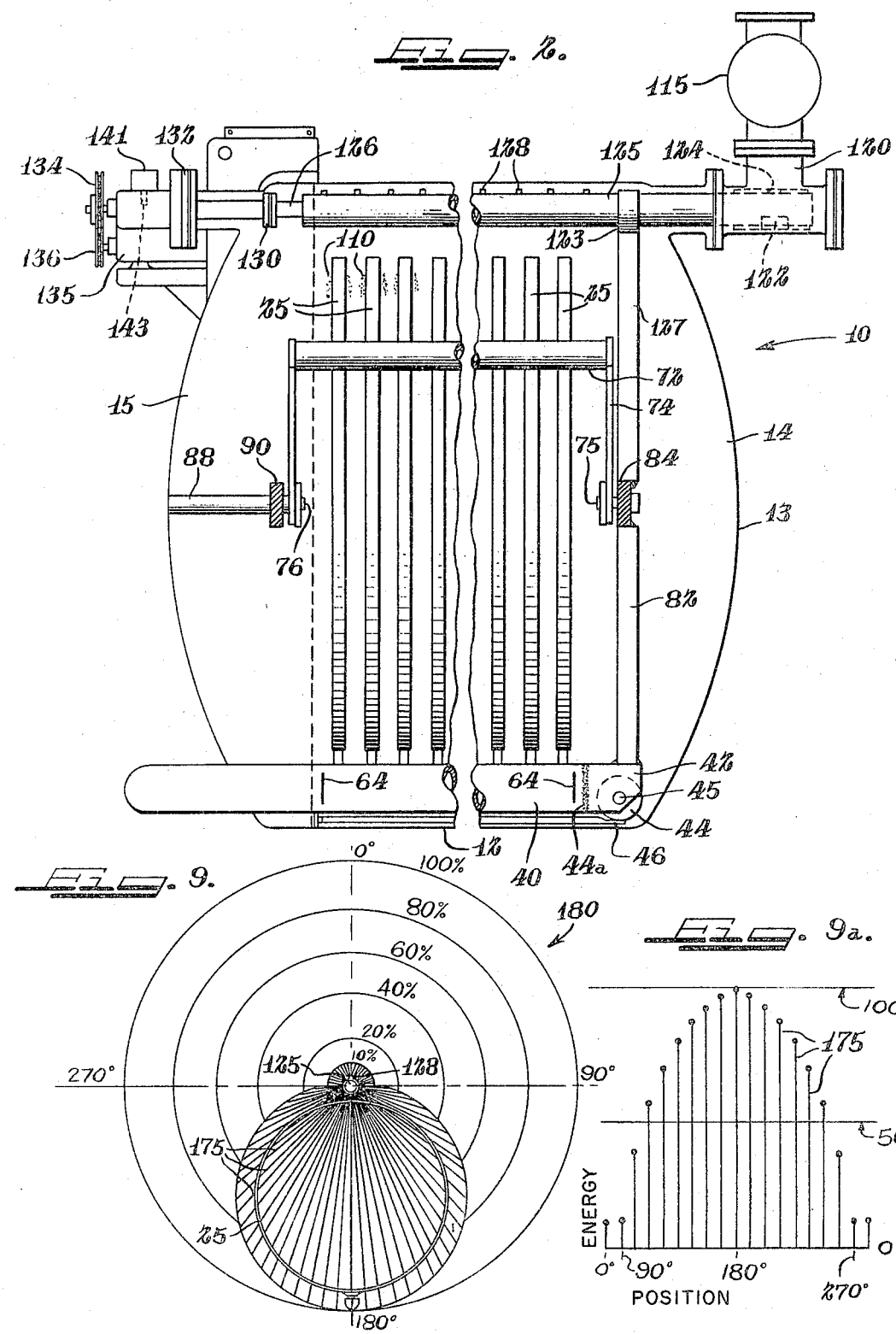

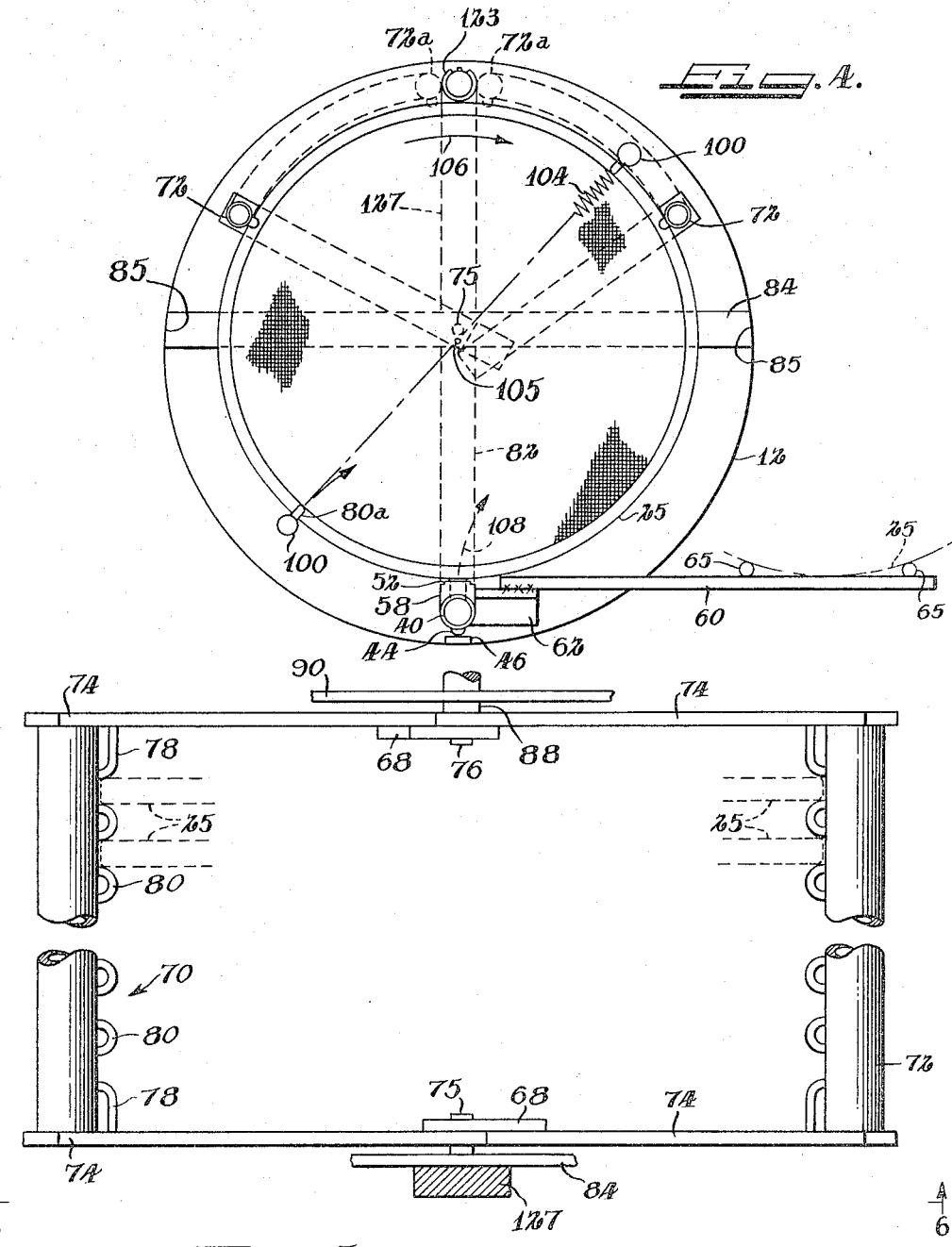

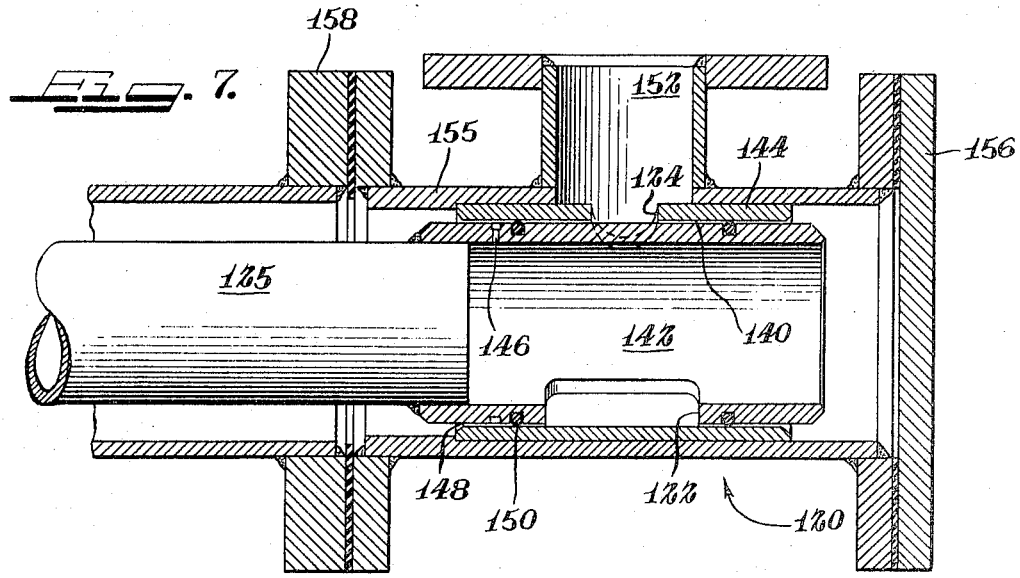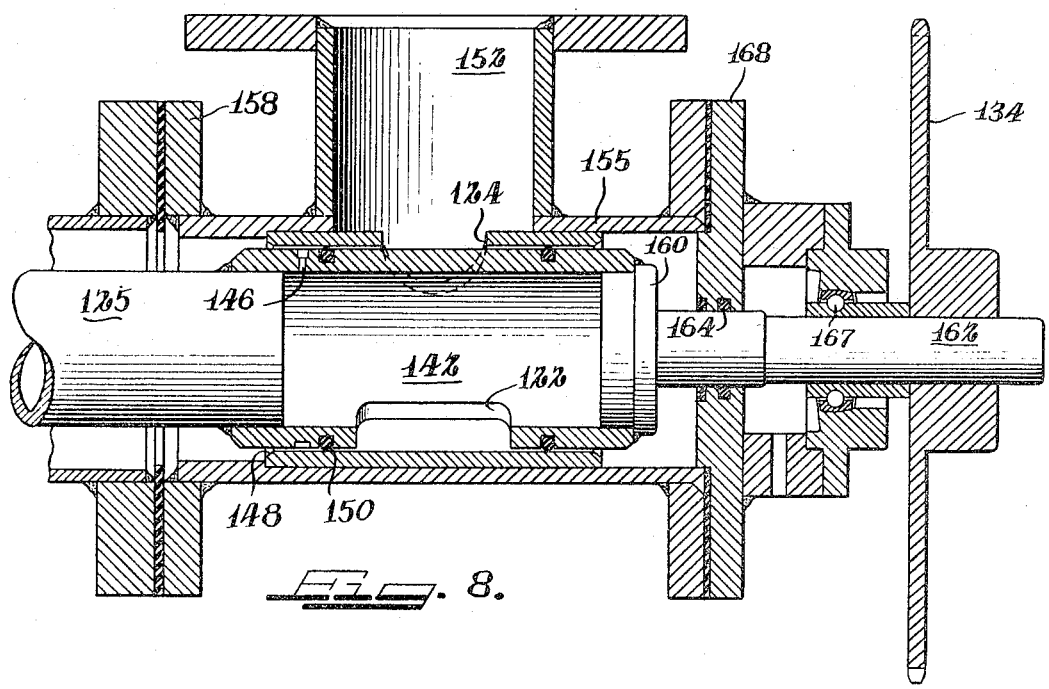

The present invention relates broadly to apparatus and method for pressure-filtering; and more particularly to leaf-type filter structure and method wherein a porous filter-cake is deposited on filter leaves for affording a desired filtering function; the cake being removed periodically when the pores become filled with filtered-out substance, and replaced with a fresh filter cake by pressure precipitation from a suspension of filter cake constituent of any of several kinds carried for deposit on the leaves by a suspending liquid therefor.

This invention is further characterized by new apparatus and method for removing filter-cake from filter leaves in situ primarily by the energy of fluid impingement, which energy creates secondary and harmonic forces because of being opposed by relatively fixed and movable leaf supports acting on the several filter leaves at spaced-apart points. The quantity of fluid used is maintained at a practicable minimum while effecting maximum cake removing function; and the movable supports further afford simultaneous removal and replacement of all of the filter leaves when desired.

Pressure filters presently in use have certain shortcomings that the present invention is directed to correcting. As an example only users of filters, when installing same, have in mind certain uses for the filters, and accordingly supply the filters with certain more or less standard accouterments. In addition to this, there are several filter leaves. Depending upon the size of the filter apparatus, there may be from about a dozen to several dozen filter leaves in a single filter unit.

After some time of usage, there may be different requirements for the filter and the same may require sets of leaves having different characteristics as by having different mesh screens, or employing different filter bags overlying the screens for accommodating different filtering media such as finely granulated charcoal, diatomaceous earth, and/or several other well-known filtering media. In extreme cases, it is desirable to completely exchange a given set of filters for another set of filters in order to use the same filter installation at different times for filter separation of different liquid and solid particles therein.

The present invention is adapted to facilitate quick changeover from one set of filter leaves to another set of filter leaves whereby to attain more utility and eliminate a substantial percentage of down time normally occasioned by a filter change. Such down time is particularly wasteful of time when filters are changed individually and not simultaneously. Simultaneous filter-leaf sub-assembly change can be accomplished readily with this invention in a manner to be explained more fully below.

It is a further essential of filters which employ a filter-cake that has an initial porosity because of the nature of the media comprising the filter-cake, when the pores between the granules, or the like, become filled up with filtered-out material, and depending upon whether the material that is filtered-out is the end product, or the fluid that passes through the filter, it is desirable to readily remove the filter-cake from time to time to carry out the filtering function most efficaciously. Different prior known filters have used low pressure back washes, apparatus for vibrating the filter leaves to physically dislodge the cake, steam and water sparges for blasting and washing off the cake, and many other combinations of these methods.

The present invention is particularly adapted, although not limited thereto, to washing-down the filter-cake periodically with a liquid. This function is also known in this art as "sluicing." The liquid most commonly used for sluicing is water; however, any suitable liquid, depending upon the material filtered out or being filtered, which is compatible with one or the other can be used in keeping with the teachings of this invention.

By employing the wash liquid in a new manner, it has been found that the amount of water expended for the wash down function can be effected most economically by automatic means for applying energy to the cake upon the filter leaves in a substantially constantly varied pattern which is semi-harmonic. This energy builds up from minimum energy to maximum energy and back to minimum energy in the jets of liquid for removing the cake.

In addition to the above feature, there is a pre-established leakage provided through valve parts to keep the jet nozzles clean in the presence of pressurized liquid to keep entrained materials to be filtered from the liquid from clogging up the orifices in the jet nozzles as well as plugging up associated operating parts with a predetermined leakage of pressurized liquid at all times.

The apparatus and method to be described in detail below is conducive to fully automatic operation of filters of this type having filter leaves that, from time to time, must be washed off and removed from the filter apparatus to be replaced by new filter media under pressure which is precipitated by pressure upon and flow through the face of the filter leaves to renew the leaves for further filtering operation in a desired manner. With certain processes, the wash down may occur several times a day, whereas in others it need not to be so frequent. However, whether frequent or not, it is desirable to provide apparatus which can automatically proceed through the filtering function, the filtering liquid draw-off function, the filtering cake wash down function, the removal of cake particles from the vessel, the rebuilding of filter cake upon the faces of the filter leaves, the initial washout of residual extraneous filter media or material that is not desired, and the re-establishment of the filter cycle. Such cycles are presently within the knowledge of those skilled in the art and the specific details of such programming has not been shown. The essential features of this invention, however, are to be explained in detail below concerning the apparatus, and methods of using the apparatus for effecting filtering functions whatever particular program may be desired for the process.

Accordingly, it is a broad object of this invention to provide improved filter apparatus.

A further object of the invention is to provide an improved filtering method.

A still further object of the invention is to provide improved apparatus affording a new method for filtering and for securing filter leaves to afford ready replacement of same.

A further object of the invention is to provide improved apparatus for washing down filter leaves including economical utilization of fluid energy.

Another object of the invention is to provide improved washing apparatus for washing articles.

A further object of the invention is to provide improved metering means and method for washing filter-cake and the like from filter leaves and the like.

Another object of the invention is to provide improved control valve means for use with jet washers.

Another object of the invention resides in improved means for securing filter leaves in a filter.

Another object in keeping with the preceding objects is to provide fluid jet means for washing down filters while causing the filters to vibrate in response to the energy expended in the removal of filter cake in a heterogeneous manner.

Another object is to provide fixed and movable means for securing filter leaves to resist the force in a manner to create secondary vibrations and harmonic vibrations to effect breaking up of filter-cake or the like.

The foregoing and other objects and advantages of this invention reside in details of construction and the arrangement and use of parts and will be either obvious or pointed out in the following specification and claims as read in view of the accompanying drawings in which:

FIG. 1 is a diagrammatic view of filter apparatus showing the filter leaves out of the vessel;

FIG. 2 is a diagrammatic view taken on the opposite side of FIG. 1 and showing the filter leaves within the vessel;

FIG. 3 is a detailed partial sectional view of a fixed filter retaining means;

FIG. 3 is a detailed partial sectional view of a fixed filter retaining means;

FIG. 4 is a diagram of a filter leaf showing arrangement of leaf retaining parts for facilitating simultaneous removal of filter leaves;

FIG. 5 is a partial plan view of movable filter leaf retaining parts;

FIG. 6 is a view looking upward toward FIG. 5 as taken on line 6—6 of FIG. 5;

FIG. 7 is a cross-sectional view of a preferred liquid jet energy metering means;

FIG. 8 is a view similar to FIG. 7 but showing a modification of the valve of this invention;

FIG. 9 is a diagram representative of energy of a fluid jet in relationship to its position relative to a filter leaf; and FIG. 9a is a rectangular co-ordinate chart transposition of the two lower quadrants of FIG. 9.

Referring now in detail to the drawings, and first to FIG. 1, a pressure vessel 10 is shown mounted by columns 11a on suitable foundation members 11, of which there may be two or more to distribute the weight of the vessel 10 and the contents thereof. The vessel 10 may be fabricated in the manner of several presently known pressure vessels and its major fixed parts comprise a cylindrical center shell portion 12, and a dished head 13 preferably welded to the shell 12. A removable dished head 15 is arranged to be secured by clamps, not shown, to a flange 16 welded to the end of the shell 12 opposite the fixed head 14.

The present apparatus is adapted for automatic operation and suitable piping 18 is provided with controlled means such as motorized valves 20, or the like, at suitable positions in the piping. The specific details of the piping 18 arrangement and control means 20 may vary substantially for different uses of the apparatus and, accordingly, involves no specific structure. However, because the apparatus is more versatile than hitherto known pressure filters, it is preferred that the control means 20 and the piping 18 be suitably secured with bolted flanges, or the like, to provide for different flow arrangements of materials into and out of the filter 10 to afford additional versatility while attaining automatically controlled operation of the filtering function.

The control means 20 are preferably automatically controlled from commercially available control apparatus in a control panel 24. Such apparatus can include time control means for operating different control means 20 for performing several timed functions in the device. It is preferred in each device that suitable flow indicating means be used so that as the effluent leaving the filter 10 attains a predetermined minimum flow value, indicative of filling up of filter-cake with material filtered out of the liquid being filtered, be arranged to institute cake sluicing or washing operations. Of course, in many installations, the wash down function may best be performed on the basis of time, or in addition to other suitable controls which may include the quantity of effluent present in a given period of time to best facilitate economical operation of a filter.

The removable head 15 is shown in FIG. 1 in the position when filter leaves 25 are installed or removed in a manner to be described hereinbelow. The head 15 is moved to the position shown in FIG. 2 by apparatus now to be described. An overhead tram rail 26 of conventional kind, such as an I-beam, is supported at one end by a post 28 and at its other end by a bracket 29 both of which may be suitably secured respectively to a floor 30 mounting the foundation 11 for the vessel 10 and to the top of the vessel 10. At the end of the tram rail 26, a pair of brackets 32 mount sprockets 34 over which a chain 35 it trained. The chain 35 is attached to a carriage 36 having rolls 38 riding on the inner edges of the bottom rail of the tram rail 26. The carriage 36 in turn is secured by a post 39 to the head 15.

An effluent pipe 40 is closed at its distal end by a U bracket 42 which is welded at 44 to seal off the end of the effluent header 40, FIG. 2. The U bracket 42 mounts a roll 44 on a pivot 45. The roll 44 travels on a track 46, or the bottom of the inside wall of the shell 12 and extends sufficiently inwardly from the end of the effluent header 40 so as to remain on the track 46 with the apparatus in the position shown in FIG. 1 as indicated by the dotted showing of the roll 44.

The header 15 is conveniently moved in and out of engagement with the fastening flange 16 by a crank 48 suitably secured to the post 28 and driving by means of a chain 50 a sprocket 49 turning a sprocket, not shown, suitably secured to the sprocket 34. As the crank 48 is turned clockwise, the upper lay of the chain 35 will move towards the right, and the lower lay thereof connected to the dolly 36 will move toward the left to drive the movable head 15 and the effluent header 40 towards the left into vessel closing position indicated diagrammatically in FIG. 2. In this latter position, suitable clamp means, not shown, is drawn up to pressure seal the head 15 to the shell 12.

*Leaf assembly*

The leaves 25 may be of any suitable shape, and in the specific embodiment to be described are preferably round. Each leaf has a bottom neck or spud 52, FIG. 3, which includes a seat or shoulder 54, a groove containing an O-ring 55 and either a short or slightly tapered neck 56. The O-ring fits the inside of a sleeve 58, which sleeve is welded to the header 40. Each leaf is thus provided, and in this device, the portion of the spud 52 entering the sleeve 58 may be of standard-for-the-trade size, but can be somewhat shorter because of securing structure now to be described.

As mentioned briefly above, there may be several dozen filter leaves in pressure filter apparatus of the present kind. The present invention affords apparatus and method for readily installing and removing filter leaves 25 simultaneously. The apparatus will now be described with reference to FIGS. 4, 5 and 6.

With the effluent header 40 in the position shown in FIG. 1, a suitable movable fixture can be in the form of a dolly 60, which may be mounted on wheels or carried by a fork truck or otherwise suitably placed in position shown in FIG. 4. The dolly 60 has at least two reference flanges 62 which can abut the effluent header 40 at reference flanges, or guides, or marks 64, FIGS. 1 and 2. The dolly 60 may contain suitable parallel locating means such as rods 65 for spacing a plurality of filter leaves 25 between spacer grooves or ridges, or the like, not shown, in the top of the dolly at right angles to the rods 65 but being spaced apart similarly to apparatus to be described hereinbelow. The spuds 52 are positioned on the dolly substantially 90° from the position shown, FIG. 4, to be rolled into engagement with the sleeves 58 as shown in full lines. The spuds 52 and the sleeves 58 of the several filter leaves comprise fixed filter leaf retaining means in this invention.

There are at least one, and preferably two, movable filter leaf retaining means 70 shown in detail in FIGS. 5 and 6. Each of these retaining means may be identical, and one end has an offset welded retainer bar 68 to permit movement of the movable retainer bars to the position shown in dotted lines at the top of FIG. 4. Because each of the movable retainer bars are identical, as shown, only one will be described in detail.

The retainer bar 70 comprises an elongate tubular member 72, such as a pipe, which has pivot arms 74 welded or otherwise suitably secured, to its end. The lower arm 74, FIG. 5, is arranged to be secured to a pivot 75, and the upper arm 74 is welded to the plate 68, in turn adapted to be mounted on a pivot 76 in alignment with the pivot 75. Each of the elongate members 72 has end abutting bars 78 and intermediate abutting bars 80 which engage and secure the sides of edges of filter leaves 25 when the surface of the elongate member or pipe 72 closely approaches and/or touches the periphery thereof. The pipe 72 can be rotated from the full lines positioned shown in FIG. 4 up to the dotted line positions 72a, in which latter position the filter leaves 25 can be removed and replaced from the operable position thereof with the spuds 52 in effluent communication with the sleeves 58 mounted on the effluent header 40, as shown in full lines in FIGS. 1, 2 and 4.

The movable securing means 70 are arranged for operation with relationship to the movable head 15 and the effluent header 40. The inverted U bracket 42 welded to the end effluent header 40 secures an upstanding post 82. At the top of the post 82 a crossbar 84 is suitably secured, and the ends 85 of the crossbar slidably engages the inside wall of the shell 12. The pivot 75 passes through the holes in the arm 74 and bracket 68 and is suitably headed by any well-known means to provide for pivotal movement of each arm 74 while retaining them in predetermined positions so that the elongate pipes 72 will engage the edges of the filter leaves 25 at proper points. The head 15 has a post 88 that terminates in the pivot 76 which can be identical to the pivot 75. A crossbar 90 extends to opposite sides of the inside wall of the head 15 and is suitably secured thereto. With this structure, the filter leaves are constrained substantially against both lateral and vertical movement, and the elongate pipes 72 will engage each filter leaf 25 accurately and with substantially an equal amount of pressure and equal area or points of engagement of the retaining pins 78 and 80 with the sides of the edges of the filter leaves 25.

*Method of installing and removing leaves*

With the parts in the positions illustrated in FIGS. 1 and 4, the following, or related, method for removing and replacing leaves can be carried out. With the leaf rack 60 suitably aligned with indicia 64 and held in place, the right-hand elongate bar 72, FIG. 4, can be raised to the position 72a and a pair of temporary retainers 100 for the leaves 25 having half-loop retainer 80a such as the retainers 80, FIG. 5, placed at diametrically opposite points in engagement with the edges of the several leaves 25. The loop retainers 80a are preferably covered with resilient frictional material, such as textured rubber for example, and a tensioning device 102 may extend across the ends of the filter assembly. With the tensioning device 102 including a spring 104 of suitable tension, sufficient friction and force will be applied to each of the filter leaves 25 to temporarily retain same in a sub-assembly.

The left-hand elongate bar 72 may be either left in place for removal of the leaves from the position shown in FIG. 4 toward the right. However, if removal is to be toward the left, this bar 72 should be moved to the left-hand position 72a and the temperature retainer bars 100 positioned approximately 90° away from the the positions indicated in FIG. 4.

The points of pivotation 75 and 76, FIGS. 2 and 4, is sufficiently spaced from the center point 105 of each of the filter leaves so that, when moved to the vertical positions 72a, the bars 72 are clear of the edges of the filter leaves 25 so that same may be rolled uninhibited toward the right as shown in FIG. 4, or to the left, if desired, for disassembly from the other side. It is of significance that this apparatus can be loaded with leaves or have same removed from the filter from either side inasmuch as filters can be placed along a right or left-hand wall while still affording ready filter removal and replacement in keeping with the teachings of this invention.

With the right-hand elongate bar 72, FIG. 4, in position 72a, the leaves can be rotated simultaneously in the direction of an arrow 106, FIG. 4, which will cause all of the spuds 52 to move in the direction of the dotted line arrow upwardly and out of the sleeves 58. After approximately 90° rotation, the leaves 25 will lie between the lateral stop bars 65 on the pallet 60 and may be suitably tied down thereto as with one or both temperary retainers 100 resiliently connected to the pallet 60 and the uppermost points of the filters.

The entire assembly of filters thus removed from the apparatus can be moved away as on dollies or by pallet truck or the like, and either processed as sub-assembled on the pallet 60 for reinsertion into the effluent header 40, or replaced by another subassembly of filter leaves 25 on another pallet 60 that may be identical to the one described above. Of course, the spuds 52 on the second pallet must likewise be in an identical position so that with the new set of leaves on the new pallet 60 may be moved by rotation of the new leaves in reverse direction through approximately 90 degrees rotation and insert the spuds 52 along the line of rotation 108 into the sleeves 58. At such time, the left-hand elongate bar 72 may be positioned as shown in full lines in FIG. 4 to arrest the motion of the subassembly of filter leaves. Thereafter, the right-hand elongate bar 72 may be moved down from the position 72a towards the upper temporary retainer 100, which is then removed, and bar 72 moved to the full line position to secure the new set of leaves for reinsertion inside the apparatus 10, as illustrated diagrammatically in FIG. 2.

The above operation is found to require only several minutes of one or two workers, depending on the number of leaves, from the time the entire set of filters is positioned, as shown in FIG. 1, until the new assembly of filters can be reinserted into the pressure vessel 10. Prior practice, including removal and replacement of individual leaves, can take one or more hours of two or more workers, and is a considerable loss of labor and process time with presently known apparatus.

*Washer structure*

As mentioned briefly above, this apparatus is particularly adapted for automatic operations wherein filter cake is deposited and media filtered therethrough to be either clarified and pass out the effluent header 40, or may have such effluent removed to attain an end product which deposits in and on the filter-cake to such an extent that the filter operation is reduced in time rate with relationship to the weight of the material deposited. At this time, automatic steps can be instituted for washing down and removing the cake, indicated diagrammatically at 110, FIG. 2, and removed through suitable lower pipe connections 112, FIG. 1. Thereafter, a new filter cake 110 is redeposited on the faces of the filter leaves 25 to start a succeeding filter cycle.

With reference to FIG. 2, the washer apparatus is shown diagrammatically as being controlled by a valve 115 connected to a pressure source 116, FIG. 1. The pressurized fluid in the source may be any of several liquids or mixtures of liquids, or liquids at different temperatures and pressures. Most commonly, the fluid is water and the same may be introduced at several temperatures including a temperature which can cause at least portions of same to change to steam intermingled with water droplets which is particularly efficacious for breaking up certain types of cake on filter faces.

The sluice fluid passes through the valve 115 to an energy metering device 120 to be described more fully hereinafter. A rotary part of the device 120 has a port 122 which cooperates with a fixed valve port 124 to pass fluid into a wash header 125. The header 125 is driven by a shaft 126 and is mounted in a bearing 123 secured atop a post 127 secured to the cross arm 84. The post guides the metering device 120 parts into the assembled position shown, FIG. 2. In the specific embodiment to be explained as a preferred embodiment below, the shaft 126 is rotated unidirectionally and rotates a number of jet nozzles 128 through a number of 360 degrees of rotation to cause jet streams of wash water to impinge upon the cake 110 on opposite faces of the leaves 25 to remove the cake and the entrapped materials thereon. The shaft 126 is driven through a suitable flexible coupling 130 through a seal bearing 132 by means of a sprocket 134 driven by a motor 135 driving a chain 136, or the like.

The motor 135 preferably has a holding switch control 141 in its circuit controlled by a conventional sensitive switch 143 of any of several well-known types cooperable with a cam, not shown. When a washing cycle is completed, the control will keep the motor 135 running unitl the jet nozzles 128 come to rest substantially in the vertical and upright position shown in FIG. 2, for a non-clogging purpose shown and described in co-pending application Ser. No. 338,181, assigned to the same assignee as the present invention.

The drive motor 135, as mentioned briefly above, is energized only at certain times and may be either manually or automatically operated depending upon the use to which the apparatus 10 is put. The master, or program control, or the like, therefore may conveniently be on the control panel 24, FIG. 1. The details of such structure, being well-known, will not be explained in more detail.

*Metering valve structure*

FIG. 7 shows details of construction of the metering device 120 shown in FIG. 2. The port 122 is shown 180 degrees away from a fixed port 124 through which water under pressure will flow. This flow is preferably between minimum and maximum amounts as the movable port 122 passes the stationary port 124. In addition, there is a constant leakage provided by clearance 140 between the external diameter of a rotary sleeve 142 and the internal diameter of a fixed sleeve 144 containing the fixed port 124. Accordingly, water will pass through the clearance 140 around the outside of the sleeve 142 and through the port 122 into the interior of the wash header 125. Accordingly, a small quantity of liquid under pressure at all times will be supplied to the jet nozzles 128 to attain a predetermined leakage of pressured water, or the like. This leakage may be approximately 10 percent of the maximum flow of wash water. Accordingly, in the presence of material to be filtered under pressure in the apparatus 10, the orifices of the jet nozzles 128 will be washed clean at all times so that none of this material can deposit and plug the jet nozzles.

In addition to this leakage, in order to prevent solids from entering and physically plugging the sleeve 142 against rotation, a small orifice 146 supplies leakage between clearance 148 and by-passing the O-ring seal 150 for the rotor sleeve 142.

Wash water enters a pipe 152 from the control valve 115, FIGS. 1 and 2, and, when the sleeve 142 is rotated the orifice 122 will periodically, in a substantially semi-harmonic manner, pass the fixed port 124 to provide intermittent and variable supply of water under pressure in jet streams issuing from the jet nozzles 128 into impingement on the filter cake 110 on the filter leaves 125.

The metering valve structure is contained in a housing 155 into which the fixed sleeve 144 may be press-fitted, and the end of the housing is closed by a flange 156. The entire assembly is attached to the vessel on the head 14 by suitable flange structure 158. The rotatable sleeve 142 is withdrawn from and reinserted in the fixed sleeve 144 each time the leaves are withdrawn and replaced, FIGS. 1 and 2. This affords ready inspection of the parts without other disassembly.

FIG. 8 shows a modification of the energy metering apparatus and like parts are identified by like reference characters. The sleeve 140 is welded to a driving flange 160 driven by a shaft 162 through a suitable seal 164 by the sprocket 134 chain driven by the motor 135. This device differs from the apparatus of FIG. 7 by driving the washer header 125 and the jet nozzles 128 thereof through the metering sleeve 140. The driving thrust of the sprocket 134 is opposed by a suitable bearing 167 of well-known kind, and the entire assembly is mounted by a flange assembly 168 to the valve housing 155. When the metering valve 120 is of the type shown in FIG. 8, the wash header 125 is secured to the vessel 10. For inspection, the flange assembly 158 and the valve 115 can be disconnected.

*Method of washing*

The present invention has the desirable attribute of in situ washing while using substantially less water for accomplishing the washing purpose than used by prior known apparatus. This is accomplished by varying the momentum of the jets of wash liquid as they pass through a predetermined path of travel with relationship to the filter leaves; and accordingly the filter-cake 110 in place thereon. The method is characterized by supplying minimum momentum at points where the least amounts of filter-cake 110 is to be washed down, and supply maximum momentum in filled portions where the maximum amount of filter-cake must be washed down.

With reference to FIGS. 9 and 9a, a filter leaf 25 is shown diagrammatically and several lines 175 indicate the energy in the form of momentum in the jet streams of wash water as a wash header 125 rotates the wash jets 128 through each 360 degrees of rotation. The amount or degree of momentum is represented by the length of the lines 175. The chart, FIG. 9a, is substantially identical to chart, FIG. 9, but from the 90 degree reference position to the 270 degree position of rotation only, with stand-by 10 percent flow adjacent these 90 and 270 degree positions.

It is to be noted that when the jets 128, when in the upper two quadrants of the circle chart 180, the amount of wash water is about 10 percent of the maximum amount available. This amount of pressurized wash water has been found to keep all of the jet orifices open, as mentioned above.

In the lower two quadrants of the circle chart 180, it is to be noted that in the lower right quadrant, with the jets being rotated clockwise, that the energy in the jet streams vary and build up to about 50 percent of energy as the jet is rotated about 30 degrees away from the 90 degrees reference line of the chart 180 at the time the jet begins to impinge upon the filter cake 110, FIG. 2.

The momentum, or energy, will increase to approximately 80 percent as the jets are rotated through the next 20 degrees of rotation to the 50 degree position below the 90 degrees reference line. From this 50 degrees position, through the succeeding 40 degrees of rotation, the jets will increase in momentum to 100 percent of the capacity thereof. This capacity is reached when the orifices 122 and 124, FIGS. 7 and 8, are in registry with each other to supply the maximum flow of sluicing water to the jet nozzles 128.

In the next succeeding 90 degrees of travel from the 180 degree position to the 270 degree position, FIGS. 9 and 9a, the level or amount of energy in the jet nozzles will reduce to approximately 10 percent at the 270 degree position. Accordingly, it is obvious that when the jet streams impinge upon the greatest amount of filter cake 110, there is the highest level of energy available in the structure to effect wash-down of cake 110.

Contrary to the above, present non-metering wash water supply devices oscillated through the lower two quadrants, FIG. 9, a full flow, use about twice as much wash liquid and expend much additional energy without accomplishing more wash-down function than is accomplished with the presently disclosed invention as practiced in accordance with the structure and arrangement of parts.

The saving is very significant when the wash liquid is not water as ordinarily available; but is hot water, or water and steam, or chemicals of different kinds that require reconstituting processes, or are wasted.

In addition to the above attributes of the invention, combined functions of the jet streams and the new mounting device for the filter leaves 25 have other useful characteristics. As the jet streams move, and vary in force from the 90 to the 270 degree positions, FIG. 9, the action of the jet streams and the reaction of the leaves 25 against points of support thereof induce vibration forces tending to free cake 110 from the faces of the leaves 25. These forces pass through null, or minimum, values three times when directed toward the three points of support, FIG. 4, for the leaves 25 provided by right-hand bar 72, the spud 52 and the left-hand bar 72. This establishes at least two significant areas of cake 110 traversed in each revolution of the jet nozzles 128 when the jet stream of wash water impinges the cake 110 at points out of alignment with a support to induce vibration of each filter leaf between support points 72 and 52 acting as fulcrums.

The filter leaf surface opposite an impinged portion is relatively free to vibrate around such fulcrum point uninhibited by jet-stream impingement. Accordingly, the adjacent portion will seek a resonant natural pendulum harmonic motion. However, such motion is inhibited, and rendered random, as long as filter cake 110 is present on the faces of the leaves 25, or temporarily being washed-down therebetween. The wash-down function is aided by induced secondary vibration because it assists jet-stream wash-down by vibrating temporarily entrapped pieces of filter-cake, as well as aiding in freeing cake 110 from faces of the filter.

While one modification of the invention, and two modifications of the wash fluid metering apparatus have been shown and described in detail, obviously several modifications, adaptations and uses for the invention will appear to others working in the art. Accordingly, the scope of the invention is to be restricted only by the scope of the appended claims.

What is claimed is:

1. In a filter-cake-type pressure-filter having a sealable vessel, a plurality of filter leaves upon which cake may deposit, and means for passing liquid to be filtered through said cake into said filter leaves; a washer for removing cake from said leaves comprising a plurality of jet nozzles for directing wash liquid into impingement on the cake on said leaves, means for supplying wash liquid through said nozzles, and means for controlling the quantity of the wash liquid to provide different amounts of energy to preselected different portions of the cake; and filter retaining means including movable securement means for securing said leaves against movement when subjected to the energy of impingement of the wash liquid on the cake.

2. A pressure-filter substantially as set forth in claim 1, said control means including means for movably cycling said jet nozzles to direct wash fluid selectively to portions of the cake in predetermined phase relationship with variations of the energy level of the wash fluid.

3. A pressure-filter substantially as set forth in claim 2, said cycling means including valve means controlled by said cycling means for modifying the energy level of the wash fluid for different positions of said jet nozzles.

4. A pressure-filter substantially as set forth in claim 3, said cycling means being rotatable, and said valve means being rotated by said cycling means.

5. A pressure-filter substantially as set forth in claim 4, rotation of said valve means being in one direction of rotation.

6. A pressure-filter substantially as set forth in claim 3, said valve means having a fixed port of a first predetermined open area, and a movable port of a second predetermined area.

7. A pressure-filter substantially as set forth in claim 6, including means forming a space in wash fluid communication with said fixed and movable ports for passing a predetermined minimum amount of wash fluid to said jet nozzles when said fixed and movable ports are spaced away from each other.

8. A cake-type pressure-filter having a sealable vessel, a plurality of filter leaves within the vessel upon which filter cake deposits, and means for passing liquid into the vessel to be filtered through said cake into said filter leaves, a washer for removing cake from said leaves comprising means for directing wash fluid into impingement on the cake on said leaves, control means for the wash fluid, and filter leaf retaining means including for each leaf at least one fixed member and one pivotable movable member for engaging each leaf at spaced apart points, each said movable member functioning with each said fixed member for securing each of said leaves against movement when subjected to the energy of impingement of the wash fluid on the cake.

9. A pressure-filter substantially as set forth in claim 8, said fixed member of said retaining means forming an outlet for the filtered liquid.

10. A pressure-filter substantially as set forth in claim 8, said movable member comprising an elongated bar contacting each leaf at a point, and spacers on said bar for engaging the sides of edges of each leaf adjacent the points of contact of said bar on each said leaf.

11. A pressure-filter substantially as set forth in claim 10, said bar including pivot mount means for mounting said bar for providing pivotable movement thereof in an arc to and from the points of contact thereof with each said leaf.

12. A pressure-filter substantially as set forth in claim 11, and a second movable bar for contacting other points of each said leaf.

13. A pressure-filter substantially as set forth in claim 12, said bars being substantially identical to each other.

14. A pressure-filter substantially as set forth in claim 13, said bars being mounted on the same pivot mount means.

15. A pressure-filter substantially as set forth in claim 14, said filter leaves being circular, and said pivot mount means being out-of-alignment with the centers of said leaves.

16. A pressure-filter substantially as set forth in claim 15, said out-of-alignment relationship being on the opposite side of the center of each said leaf from said fixed member.

17. A cake-type pressure-filter having a sealable vessel, a plurality of filter leaves within the vessel upon which filter cake deposits, and means for passing liquid into the vessel to be filtered through said cake into said filter leaves, a washer for removing cake from said leaves comprising a plurality of power driven rotary jet nozzles for directing wash fluid into impingement on the cake on said leaves, means connected with said nozzles for supplying wash fluid to said nozzles, means for cyclically controlling the amount of wash fluid provided at different nozzle positions to provide different levels of energy to preselected portions of the cake, and filter leaf retaining means comprising for each leaf at least one fixed member and two movable members for engaging each leaf at spaced apart points on different sides of the fixed member.

18. A cake-type pressure-filter having a sealable vessel, a plurality of filter leaves within the vessel upon which filter cake deposits, and means for passing liquid into the vessel to be filtered through said cake into said filter leaves, a washer for removing cake from said leaves comprising a plurality of jet nozzles for directing wash fluid into impingement on the cake on said leaves, means supplying wash fluid to said nozzles, and means for controlling a supply of wash fluid to provide different levels of energy to preselected portions of the cake; and filter leaf retaining means comprising for each leaf at least one fixed member and one movable member for engaging each leaf at spaced apart points, each said movable member functioning with each said fixed member for securing each of said leaves against movement when subjected to the energy of impingement of the wash fluid on the cake.

19. A filter-cake-type pressure-filter having a plurality of filter leaves upon which cake deposits, means for removing cake from said leaves comprising a source of pressurized wash liquid, a plurality of nozzles for directing jets of said wash liquid into impingement on the cake on said leaves, means for controlling the quantity of the wash liquid in a predetermined manner for imparting varying amounts of energy thereto, and said control means including means for moving said jets through a predetermined path of travel with relationship to the cake on said filter leaves while varying the energy of said jets.

20. A pressure-filter substantially as set forth in claim 19, said means for moving said jets cyclically moves said jet nozzles to direct wash fluid selectively to portions of the cake in predetermined phase relationship with variations of the energy level of the wash fluid.

21. A pressure-filter substantially as set forth in claim 20, said cycling means including valve means controlled by said cycling means for modifying the energy level of the wash fluid for different positions of said jet nozzles.

22. A pressure-filter substantially as set forth in claim 21, said cycling means being rotatable, and said valve means being rotated by said cycling means.

23. A pressure-filter substantially as set forth in claim 22, rotation of said valve means being in one direction of rotation.

24. A pressure-filter substantially as set forth in claim 21, said valve means having a fixed port of a first predetermined open area, and a movable port of a second predetermined area.

25. A pressure-filter substantially as set forth in claim 24, including means forming a space in wash fluid communication with said fixed and movable ports for passing a predetermined minimum amount of wash fluid to said jet nozzles when said fixed and movable ports are spaced away from each other.

26. A cake-type pressure-filter having a plurality of filter leaves upon which filter cake deposits, a washer for removing the cake from said leaves by directing jets of wash fluid under pressure into impingement on the cake on said leaves, and filter leaf retaining means including for each leaf at least one fixed member and one pivotable movable member for engaging each leaf at spaced apart points of contact, each said movable member functioning with each said fixed member for securing said leaves against movement when subjected to the energy of impingement of the wash fluid on the cake.

27. A pressure-filter substantially as set forth in claim 26, said fixed member of said retaining means forming an outlet for the filtered liquid.

28. A pressure-filter substantially as set forth in claim 26, said movable member comprising an elongated bar, and spacers on said bar for engaging the sides of edges of each leaf adjacent the points of contact of said bar on each said leaf.

29. A pressure-filter substantially as set forth in claim 28, said bar including pivot mount means for mounting said bar for providing pivotable movement thereof in an arc to and from the points of contact thereof with each said leaf.

30. A pressure-filter substantially as set forth in claim 29, and a second movable bar for contacting other points of each said leaf.

31. A pressure-filter substantially as set forth in claim 30, said bars being substantially identical to each other.

32. A pressure-filter substantially as set forth in claim 31, said bars being mounted on the same pivot mount means.

33. A pressure-filter substantially as set forth in claim 32, said filter leaves being circular, and said pivot mount means being out-of-alignment with the centers of said leaves.

34. A method of removing filter cake from pressure-filter leaves comprising the steps of providing a plurality of jets of wash liquid, impinging the jets on the cake on said leaves while sweeping the jets across the entire surface of the cake, and controlling the quantity of the wash liquid at different points of sweep of the jets to provide different amounts of energy to different portions of the cake.

35. A method substantially as set forth in claim 34, wherein the energy of each of the jets is maximum at a point where the most filter cake area is impinged upon thereby.

36. A method substantially as set forth in claim 34, wherein the sweep is through a path of rotation.

37. A method substantially as set forth in claim 36, wherein the path of rotation is unidirectional.

38. A method substantially as set forth in claim 36, wherein the sweeping steps and quantity controlling steps are in time-phase with each other.

39. A method substantially as set forth in claim 38, wherein the energy of each of the jets is maximum at a point where the most filter cake is normally present in the filter leaves.

40. In a pressure-filter having a plurality of filter leaves, an effluent header, means for receiving said filter leaves in effluent communication relationship with said header, pivotable movable means for simultaneously securing said leaves to said receiving means when moved to one position, and means for removing said leaves when said movable means is moved to another position.

41. A pressure-filter substantially as set forth in claim 40, said movable means comprising an elongated bar contacting each leaf at a point, and spacers on said bar for engaging the edges of each leaf adjacent the points of contact of said bar on each leaf.

42. A pressure-filter substantially as set forth in claim 41, said bar including pivot mount means for mounting said bar carried at least in part by said header for providing pivotable movement of said bar in an arc to and from the points of contact thereof with each leaf.

43. A pressure-filter substantially as set forth in claim 42, and a second movable bar for contacting other points of each leaf.

44. A pressure-filter substantially as set forth in claim 43, said bars being substantially identical to each other.

45. A pressure-filter substantially as set forth in claim 44, said bars being mounted on the same pivot mount means.

46. A pressure-filter substantially as set forth in claim 45, said filter leaves being circular, and said pivot mount means being out-of-alignment with the centers of said leaves.

References Cited by the Examiner

UNITED STATES PATENTS

| | | | |
|---|---|---|---|
| 2,609,101 | 9/1952 | Howland et al. | 210—334 |
| 2,731,157 | 1/1956 | Purmort | 210—391 X |
| 2,868,379 | 1/1959 | Hunziker | 210—391 X |
| 2,874,848 | 2/1959 | Cannon et al. | 210—332 |
| 2,936,075 | 5/1960 | Davis | 210—347 X |
| 3,240,338 | 3/1966 | Schmidt et al. | 210—334 X |

REUBEN FRIEDMAN, *Primary Examiner.*

D. M. RIESS, *Assistant Examiner.*